Nov. 11, 1958 A. D. BRUNDAGE 2,859,876
FILTER
Filed Sept. 13, 1955 4 Sheets-Sheet 1

Inventor
ALAN D. BRUNDAGE

Nov. 11, 1958    A. D. BRUNDAGE    2,859,876
FILTER
Filed Sept. 13, 1955    4 Sheets-Sheet 2

Inventor
ALAN D. BRUNDAGE
By Hill, Sherman, Meroni, Gross & Simpson Attys

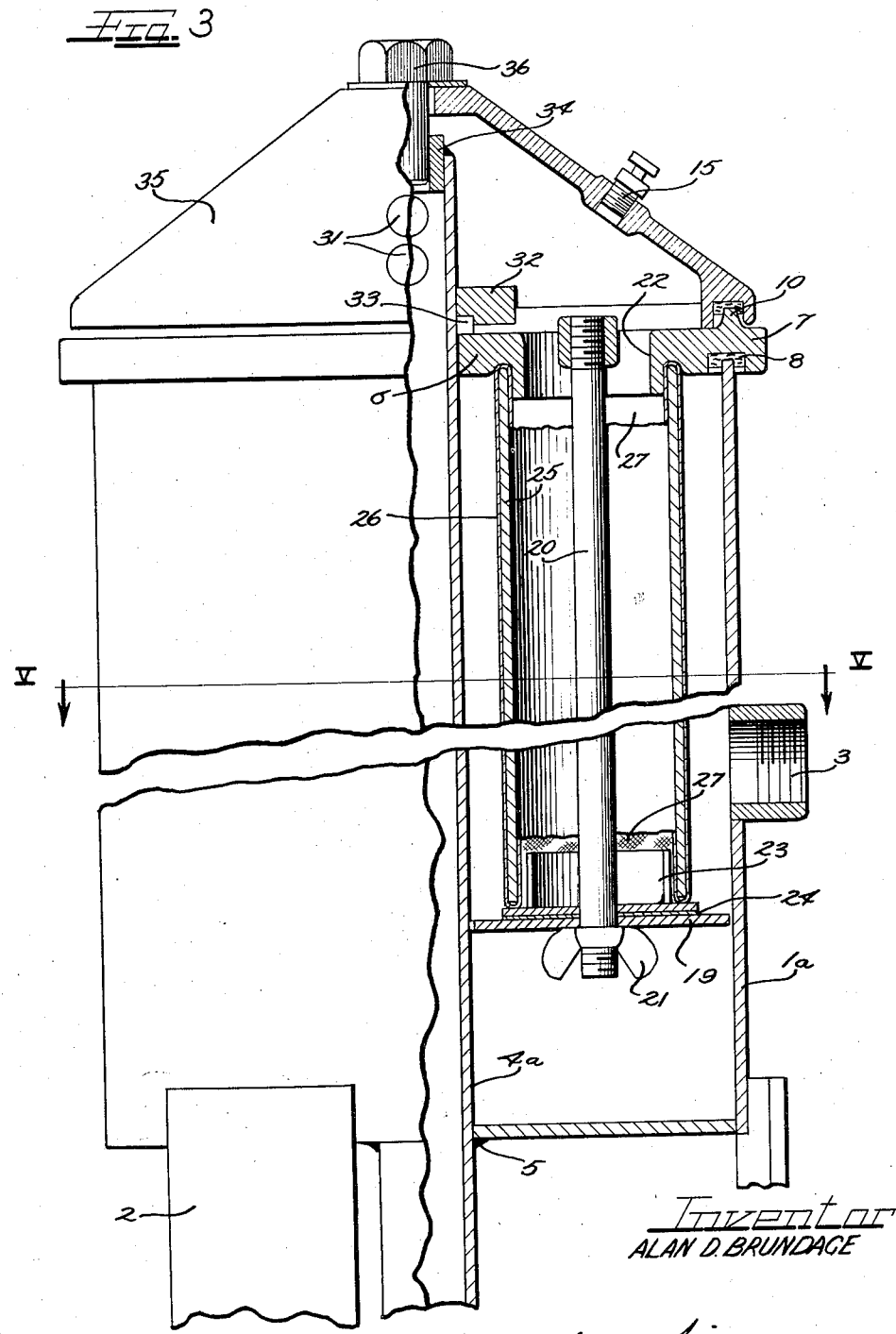

Nov. 11, 1958     A. D. BRUNDAGE     2,859,876
FILTER

Filed Sept. 13, 1955     4 Sheets-Sheet 4

Inventor
ALAN D. BRUNDAGE

United States Patent Office

2,859,876
Patented Nov. 11, 1958

2,859,876

FILTER

Alan D. Brundage, Birmingham, Mich., assignor to Indiana Commercial Filters Corporation, a corporation of Indiana Application September 13, 1955, Serial No. 533,968

4 Claims. (Cl. 210—323)

This invention relates to improvements in a clarifier, and more particularly to a clarifier or filter unit of the type highly desirable for the cleansing of coolants such as water base or light mineral oils and others utilized for cooling tools on cutting, grinding, threading, and similar machines, although the invention will have other uses and purposes as will be apparent to one skilled in the art.

In the past, many and various types of filters or clarifiers, such as those used for various coolant or cutting oils, have been developed, but have proven objectionable in many cases owing to the fact that servicing was required at too frequent intervals, and by virtue of the construction of the clarifying unit, servicing was objectionably difficult and time consuming. Where a bank of machines are installed and arranged for substantially continuous operation, the amount of time in which those machines must be shut down in order to clean out coolant clarifying or filtering means is an extremely important factor in the economy of production. Likewise, the efficiency of the clarifying or filtering means is an important factor in economy of production, since it is essential that the life of the tools be increased to the longest possible extent, dressing of the tools is reduced to a minimum, the life of the coolant itself be increased as long as possible, and the clarification should be continuous and automatic.

With the foregoing in mind, it is an important object of the instant invention to provide clarifying means which are highly efficient, simple in construction, and very economical to use.

Another object of the invention is the provision of clarifying means, highly desirable for the filtering of coolant oils or the like, which are continuous and substantially automatic in operation, and which may readily be designed to operate with different types of filter elements, so as to better perform for individual conditions.

Still another object of the invention resides in the provision of a clarifying or filtering unit, highly desirable for the filtration of coolant oils and the like, so constructed as to take advantage of accumulated contaminants on the surface of the filtering elements to add to the filtering ability of the elements, in certain cases the degree of filtration being determined by the nature of the contaminants, fine contaminants providing a denser layer for fine filtration, and coarse contaminants such as chips, providing a less dense layer having greater porosity.

Still a further feature of the invention resides in the provision of a clarifier or filter, highly desirable for the filtration of coolant oils and the like, and which is so constructed that the entire filtering mechanism may be removed from the casing as a single unit for cleansing purposes, or replacement of filter elements, as the case may be, with a minimum of effort and a minimum of time consumption, thereby lessening the shut-down time of the machines with which the clarification device is associated.

It is also an important object of this invention to provide a clarification device, highly desirable for the filtering of coolant oils and the like, which device is so constructed that the entire filtering mechanism may be removed from the casing as a unit, and this mechanism is so constructed as to carry therewith the major portion of accumulated contaminants, sludge, and sediment, so that the device is reconditioned for further usage by the simple expedient of removing the filter mechanism, cleansing it, and replacing it, all of which may be accomplished simply and in a very short time.

A further feature of the invention resides in the provision of a clarification device which incorporates a sludge or sediment accumulating plate removable along with the filtering means when cleansing is necessary, so that the sludge and sediment may be carried out of the casing in an extremely simple operation.

While some of the more salient features, characteristics and advantages of the instant invention have been above pointed out, others will become apparent from the following disclosures, taken in conjunction with the accompanying drawings, in which—

Figure 3 is a view similar in character to Fig. 1, but illustrating a clarifying device of smaller size than that shown in Fig. 1;

As shown on the drawings:

Figure 1:
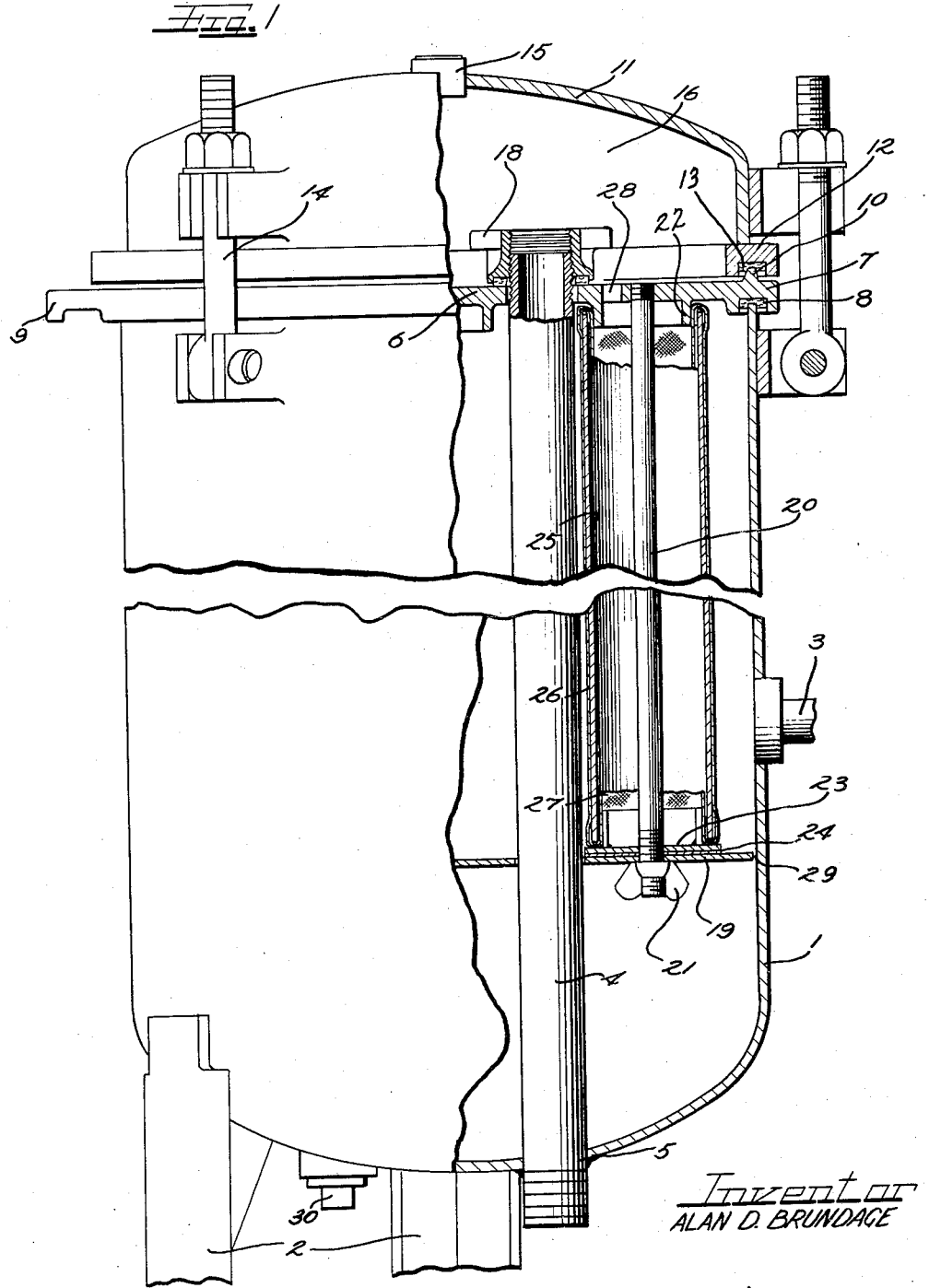
Figure 1 is a fragmentary part side elevational, part vertical sectional view of a clarifying device embodying principles of the instant invention.
Figure 2:
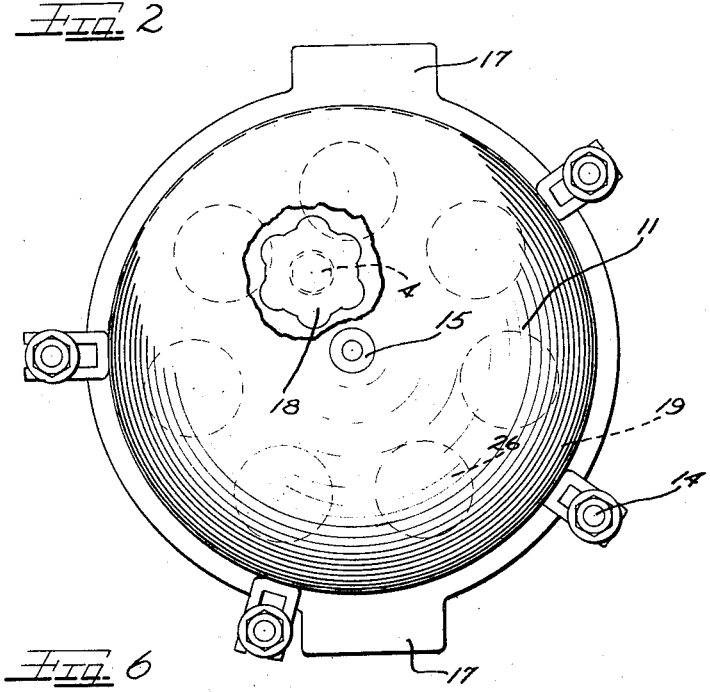
Figure 2 is a reduced top plan view of the structure of Fig. 1, with parts broken away to illustrate parts therebeneath.

In that illustrated embodiment of the instant invention as seen in Figs. 1 and 2, there is shown a clarifying device comprising a casing 1 which has an open top, and a closed bottom. This casing may be supported on any suitable means such as legs 2. In the illustrated instance, the casing is provided with an inlet 3 for contaminated liquid which may enter through the casing wall in substantially any desired location, preferably substantially in the intermediate side wall region of the casing, and this inlet passes just through the casing wall. The casing is also provided with a suitable filtrate outlet, which in the illustrated instance is in the form of a vertical pipe 4 extending well upwardly within the casing, and welded or equivalently secured to the casing bottom as indicated at 5, this pipe projecting through the bottom of the casing.

Preferably all of the filtering mechanism is supported from an upper plate 6 having a circumferential flange 7 defining a downwardly opening groove for the reception of a gasket 8, this flange seating directly over the upper edge of the casing 1 as clearly seen in Fig. 1. At diametrally opposite points, this plate may be provided with a pair of projecting handles 9, only one of which is illustrated in the drawings, for purposes of clarity. These handles, of course, are to aid in the removal of the plate when cleansing of the clarifying device is necessary.

Also, as seen best in Fig. 1, the plate 6 is provided with an upstanding circumferential bead 10, preferably just above the center portion of the groove defined by the flange 7. This bead 10 provides a seat for a casing cover 11 which is also provided with a circumferential flange arrangement as indicated at 12 to define a downwardly opening groove for the reception of a gasket 13, which seats upon the bead 10 of the plate 6. Suitable swing bolts 14 may be provided to hold the cover firmly and tightly in position, and the gaskets 8 and 13 effect a positive seal at the top of the casing when the cover is mounted in position. The cover may be provided with any suitable form of air vent, diagrammatically indicated at 15, if deemed necessary.

It will be noted particularly from the showing in Fig. 1, that the cover 11 is of somewhat dome shape so as to provide a space 16 between the plate 6 and the cover itself for the accumulation of filtrate. Further, the cover, as seen in Fig. 2, may be provided with a pair of opposed handles 17—17 to aid in its removal when desired.

Filtrate descends through the aforesaid pipe 4 from the space 16, and the projecting end of the pipe above the plate 6 is threaded to accommodate a collar-type hand-manipulated nut 18 which effects a seal between the pipe and the plate 6, and also serves to aid in holding down the plate 6 so that the assembly is rigid when in use.

All of the filtering mechanism is preferably carried by the plate 6 so as to be removable as a unit along with this plate. The casing may be constructed to accommodate a plurality of filtering units or elements, and in the illustrated instance the casing is shown with eight such elements therein.

Now, with reference again to Fig. 1, it will be seen that each filtering element is preferably clamped between the upper plate 6 and a lower plate 19. The plate 19 is suspended from the plate 6 by a plurality of supporting members in the form of elongated bolts 20 having one end threaded into the plate 6, and the lower end threaded and extending through the plate 19 to receive thereon a thumb nut 21.

Each individual filter element is tubular in character, and in this instance each element is supported around a depending cylindrical flange 22 on the upper plate 6 concentric with the bolt 20, and a similar flange 23 resting on the plate 19, with a gasket 24 interposed therebetween for sealing purposes. In this instance, the filter element includes a tubular screen 25 around which is a tubular fabric 26 preferably stretchable and which may satisfactorily be in the form of cotton socking material. The end marginal portions of the fabric 26 are turned inwardly between the screen and the respective circular flange as indicated at 27, at each end of the element. The ends of each individual filter element will be in contact at the top against the plate 6, and at the bottom against the flange member 23 so that the tubular fabric is effectively held in position. In the illustrated instance, there is one such filter element around each of the supporting bolts 20. The plate 6 is provided with one or more apertures 28 (best illustrated in the showing of Fig. 4) inside the circumference of each filter element so that filtrate may pass through such apertures into the space 16 to descend through the pipe 4.

An important feature of the instant invention is the lower plate 19 which, from the showing in Fig. 1, is preferably of a diameter slightly less than the inside diameter of the casing 1 leaving a relatively small annular space 29 between the plate and the casing wall. Most of the dropping contaminants, sediment, sludge, and the like, will therefore accumulate on the upper surface of this plate.

In operation, the instant invention is extremely simple and highly efficient. Contaminated liquid may enter through the inlet 3, pass radially through the filter elements, and contaminants, chips, grindings, and the like, will collect on the outer face of the tubular fabric 26. Depending upon the fineness of these contaminants, the degree of filtration will be determined, since the accumulated contaminants will also function as a filtering means, substantially in the manner a precoat filter element performs. Filtrate enters the inside of each tubular filter element, passes upwardly through the opening 28 in the plate 6, into the space 16, and descends through the pipe 4.

Should the pressure within the tank or casing 1 rise sufficiently to indicate the need of cleansing the filter elements, it is a simple expedient to remove the casing cover 11, remove the collar nut 18, and lift the plate 6 out of the casing, this plate carrying therewith as a unit all of the filter elements and the plate 19. The major portion of dropped contaminants, and accumulated sediment and sludge, will be carried out of the casing on top of the lower plate 19, so that this individual removement effectively cleanses the entire device for further operation. After the removal of the filtering means, they may be jarred to shake loose accumulated contaminants or otherwise cleansed, reinserted in the casing and the operation may be resumed in a very short time. Only at rare intervals will it be necessary to flush out the casing 1 through an opening normally closed by a sludge plug 30 at the bottom.

The particular tubular fabric elements 26 need not be replaced except at long intervals, in the event one of them becomes torn. It is a simple expedient to replace the element with the aid of a thumb nut 21, releasing the lower plate 19, removing the particular bad element, and placing a new tubular fabric over it. But in the normal course of operation assuming the tubular fabrics 26 to be intact, the entire device may be reconditioned for further operation in an extremely short time merely by removing all of the filtering mechanism as a unit, jarring it to release contaminants, and replacing it in the casing.

Figure 4:
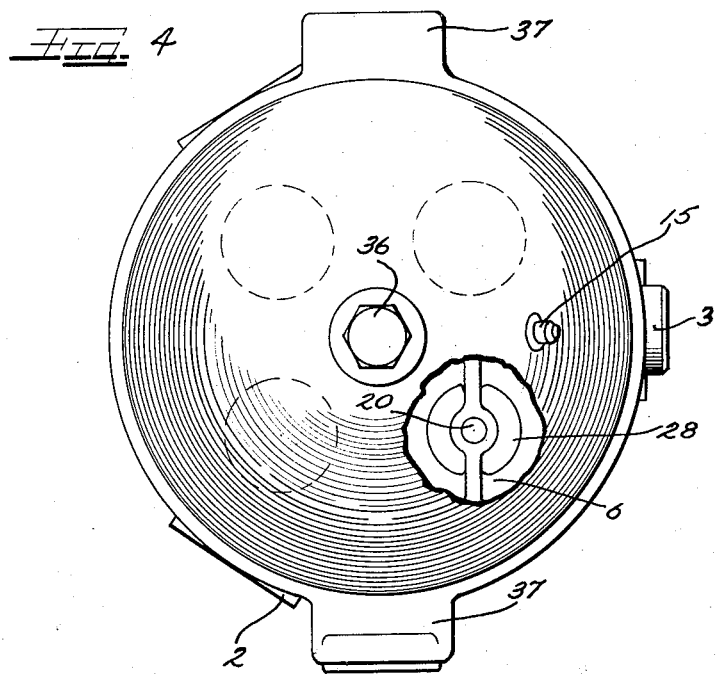
Figure 4 is a top plan view of the structure of Fig. 3, with parts broken away to illustrate structure therebeneath.
Figure 5:
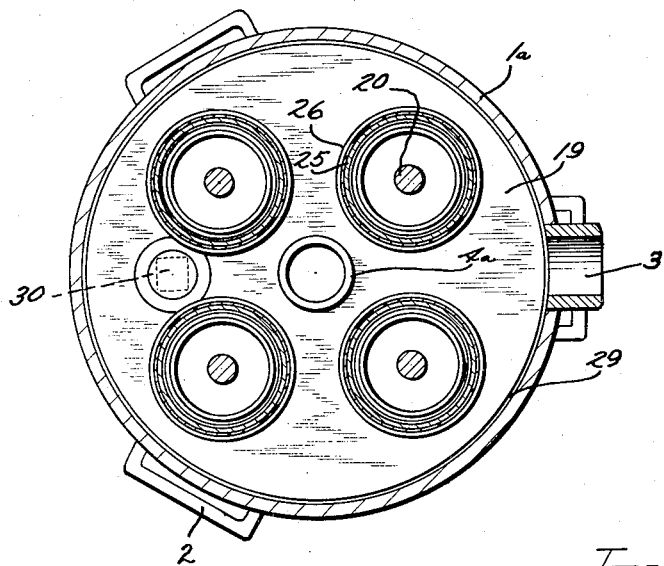
Figure 5 is a reduced plan sectional view taken substantially as indicated by the line V—V of Fig. 3, looking in the direction of the arows.

In Figs 3, 4 and 5 I have illustrated the structure of a smaller clarifying device, in which, in the illustrated instance, four filter elements are embodied. In this instance, the same general type of casing, now numbered 1a, is employed, and the filter elements themselves are of the same construction as above explained. As before, the plate 6 together with the lower plate 19 and all of the filter elements are removable from the casing 1a as a unit for cleansing purposes.

In this instance, however, the filtrate outlet or standpipe 4a is centrally disposed and extends well above the plate 6, being provided with one or more apertures 31 in the portion extending above the plate 6. Around this standpipe is a collar-type nut 32 threaded on the upper end of the pipe 4a which may be tightened down against a gasket 33 sealing off the pipe so that filtrate can only pass through the apertures 31. The upper end of the pipe 4a is preferably provided with an inside nut 34, welded or equivalently secured to the pipe, this nut being used for reinforcing purposes.

In this instance, a smaller cover 35 is utilized having the same circumferential sealing arrangement as above described. This cover is preferably in the shape of the frustum of a cone, with the apex at the top. Centrally disposed through this apex is a securing stud bolt 36, which may be threadedly engaged in the nut 34 in the upper end of the standpipe to hold the cover on the casing. The cover may be provided with opposed handles 37—37 as seen in Fig. 4 to aid in its removal and replacement.

Outside of the simplified form of cover and its attachment utilized in this arrangement, and which is permitted by virtue of the lesser number of filter elements, the structure of Figs. 3, 4 and 5 operates in the same manner as above described in connection with the structure of Figs. 1 and 2. The only real difference between the two structures, is that the first described is of a larger size, while that of Figs. 3, 4 and 5 is a smaller size having less capacity.

Figure 6:
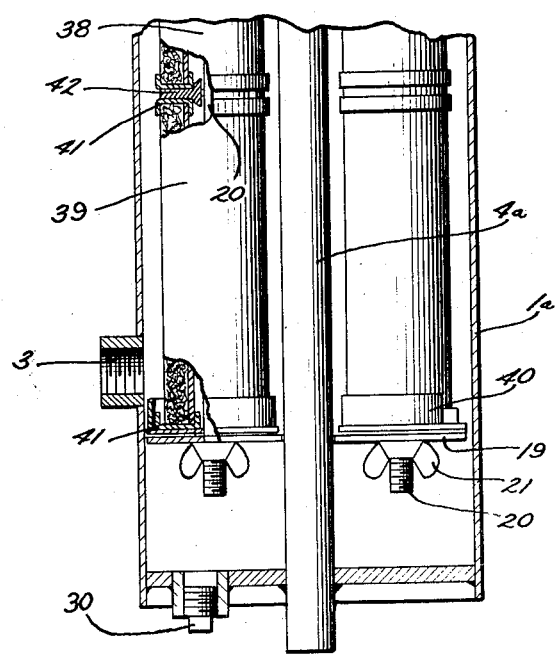
Figure 6 is a fragmentary central vertical sectional view illustrating the use of throw-away type filtering cartridges with the instant invention.

In Fig. 6 I have illustrated how the instant invention may be utilized with filter cartridges of the so-called "throw-away" type. Cartridges of this type are used for a predetermined time, or until the pressure gauge indicates an adverse collection of contaminants, then are removed, thrown away, and new cartridges substituted therefor. In this instance, I have illustrated the same casing structure as shown in Figs. 3, 4 and 5 equipped with throw-away cartridges 38 and 39, each set of such cartridges being preferably stacked one upon the other around one of the supporting bolts 20. In this instance, it is preferable to employ an outside skirt or flange at each end of the filter element, as indicated at 40 above the lower plate 19, and a similar arrangement may be provided for the upper plate 6. In the illustrated instance, the cartridges may be of any suitable type, each cartridge having a flange or closure 41 at each end thereof, and suitable gasket means 42 may be disposed between confronting ends of the cartridge, these gasket means being preferably arranged to seal off one cartridge from the other around the supporting bolt 20. The cartridges 38 and 39 may be of any desired structure, and of substantially any desired material depending upon the specific substance to be filtered.

When it is desired to replace cartridges, it is a simple expedient to remove the casing cover, withdraw the entire filtering mechanism as a unit, remove the thumb nut 21, drop the plate 19, permit the cartridges to slide off the respective supporting bolts 20, and mount new cartridges in position and replace the plate 19. This operation may take slightly more time than the cleansing of the filter elements described in connection with Figs. 1 to 5 inclusive, but in some instances throw-away cartridges are preferred, and the instant operation requires less time than with structures utilizing throw-away cartridges heretofore known.

From the foregoing, it is apparent that I have provided an economical clarifying unit, highly desirable for the filtration of coolant oils and the like, but which may be used for other substances if so desired, and which is simple in construction, readily and easily serviced, and highly economical to manufacture and use.

It will be understood that modifications and variations may be effected without departing from the scope of the novel concepts of the present invention.

I claim as my invention:

1. In a filter unit, an open-topped casing, a flanged upper plate seated on the top of said casing, a cover seated on said plate adjacent the rim thereof, a plurality of elongated supporting members suspended from said plate, a lower plate carried by said members above the casing bottom, a tubular filter element betwen said plates around each supporting member, said upper plate having an opening therein adjacent each said supporting member and within the circumference of the respective filter element, a filtrate pipe extending through said plates and the casing bottom, said pipe being secured to the casing bottom, a removable collar type unit around the upper end of the pipe above the upper plate, and said casing having an inlet opening for contaminated liquid below the upper plate, said plates, supporting members and filter elements being removable from the casing as a unit and separable outside said casing to replace filter elements.

2. In a filter unit, an open-topped casing, a flanged upper plate seated on the top of said casing, a cover seated on said plate adjacent the rim thereof, a plurality of elongated supporting members suspended from said plate, a lower plate of a diameter slightly less than the inside of said casing carried by said members above the casing bottom, a tubular filter element between said plates around each supporting member, said upper plate having an opening therein adjacent each said supporting member and within the circumference of the respective filter element, a filtrate pipe secured to the casing bottom and projecting through said upper plate, and a cover holding stud bolt engageable in the upper end of said filtrate pipe, said casing having an inlet opening below said upper plate.

3. In a filter unit, a casing, an upper plate supported by the casing wall, elongated supporting members suspended from said plate, a lower sediment catching plate carried by said members above the casing bottom, a tubular filter element around each said member between said plates, said plates and said filter elements being removable from said casing as a unit for cleaning purposes, and said elongated supporting members being releasable from said plates for replacement of filter elements when necessary.

4. In a filter unit, an open-topped casing, a plate carrying a gasket to seat on the top of said casing, a cover also carrying a gasket to seat on the marginal portion of said plate, an outlet tube upstanding from the bottom of said casing and extending through said plate, a unitary filter assembly suspended from said plate and including supporting members depending from said plate, a lower plate secured to and suspended from said supporting members above the casing bottom, tubular filter members around each supporting member between said plates, and the first said plate having an opening in line with each filter member for the discharge of filtrate above the first said plate.

References Cited in the file of this patent

UNITED STATES PATENTS

| | | |
|---|---|---|
| 360,441 | Howes | Apr. 5, 1887 |
| 655,841 | Watson et al. | Aug. 14, 1900 |
| 802,714 | Smith | Oct. 24, 1905 |
| 2,337,238 | Griffith | Dec. 21, 1943 |
| 2,565,445 | Winslow | Aug. 21, 1951 |
| 2,625,273 | Schuller | Jan. 13, 1953 |